US008838740B2

(12) United States Patent
Miyashita

(10) Patent No.: US 8,838,740 B2
(45) Date of Patent: Sep. 16, 2014

(54) INFORMATION PROCESSING APPARATUS THAT CONTROLS DEVICE VIA NETWORK AND METHOD OF CONTROLLING THE APPARATUS, DEVICE CONTROL APPARATUS AND METHOD OF CONTROLLING THE APPARATUS, AS WELL AS DEVICE CONTROL SYSTEM

(71) Applicant: Canon Imaging Systems Inc., Niigata (JP)

(72) Inventor: Ryosuke Miyashita, Niigata (JP)

(73) Assignee: Canon Imaging Systems Inc. (JP)

( * ) Notice: Subject to any disclaimer, the term of this patent is extended or adjusted under 35 U.S.C. 154(b) by 170 days.

(21) Appl. No.: 13/644,409

(22) Filed: Oct. 4, 2012

(65) Prior Publication Data

US 2013/0091245 A1 Apr. 11, 2013

(30) Foreign Application Priority Data

Oct. 7, 2011 (JP) .................................. 2011-223459

(51) Int. Cl.
*G06F 15/16* (2006.01)
*H04L 29/08* (2006.01)
(52) U.S. Cl.
CPC .............................. *H04L 29/08009* (2013.01)
USPC ........... 709/217; 709/203; 709/225; 370/254; 370/389
(58) Field of Classification Search
CPC ..... G06F 21/6218; H04L 63/00; H04L 65/00; H04L 65/80
USPC .................. 709/203, 217, 225; 370/254, 389
See application file for complete search history.

(56) References Cited

U.S. PATENT DOCUMENTS

| 7,185,136 | B2 | 2/2007 | Zarns |
| 7,933,992 | B2 * | 4/2011 | Wada ............................ 709/225 |
| 8,631,087 | B2 * | 1/2014 | Ise et al. ........................ 709/217 |
| 2005/0198494 | A1 * | 9/2005 | Ishibashi ....................... 713/155 |
| 2006/0293061 | A1 * | 12/2006 | Kobayashi et al. ........... 455/455 |
| 2008/0080398 | A1 * | 4/2008 | Yasuie et al. .................. 370/254 |
| 2009/0164566 | A1 * | 6/2009 | Kawai et al. .................. 709/203 |
| 2010/0183001 | A1 * | 7/2010 | Fujimoto et al. .............. 370/352 |
| 2012/0117069 | A1 * | 5/2012 | Kawanishi et al. ........... 707/740 |
| 2012/0236854 | A1 * | 9/2012 | Takagishi et al. ............. 370/389 |
| 2012/0281909 | A1 * | 11/2012 | Hosoi ........................... 382/159 |

* cited by examiner

*Primary Examiner* — Tesfay Yohannes
(74) *Attorney, Agent, or Firm* — Rossi Kimms & McDowell LLP

(57) ABSTRACT

An information processing apparatus capable of suppressing an increase in traffic on the network, and transmitting data even when the platform is different between a transmitting-side device and a receiving-side device. When a transfer request to the device is received from an upper layer software program, a virtualized controller extracts predetermined parameters necessary for controlling the device from parameters included in the transfer request, transmits the extracted parameters to the device, and stores the other parameters. When response parameters corresponding to the request parameters are received, a communication controller generates a transfer response by adding the stored parameters to the response parameters and transfers the generated transfer response to the upper layer software program.

10 Claims, 7 Drawing Sheets

INFORMATION PROCESSING APPARATUS THAT CONTROLS DEVICE VIA NETWORK AND METHOD OF CONTROLLING THE APPARATUS, DEVICE CONTROL APPARATUS AND METHOD OF CONTROLLING THE APPARATUS, AS WELL AS DEVICE CONTROL SYSTEM

BACKGROUND OF THE INVENTION

1. Field of the Invention

The present invention relates to an information processing apparatus for controlling a device, such as a printer, via a network, and a method of controlling the apparatus, a device control apparatus and a method of controlling the apparatus, and a device control system.

2. Description of the Related Art

Conventionally, there has been known a device control system in which an information processing apparatus controls a device via a network, such as a LAN (local area network). In this device control system, when a client PC on the network uses a device, such as a printer, a storage, or a scanner, the client PC accesses the above-mentioned device regarded as a shared device, via a device server which is one of device control apparatuses.

On the other hand, there has been proposed a system in which when a client PC uses a device via a network, the client PC encapsulates data into packets (packetizes data), and then transmits the packets to the device server via the network (see e.g. U.S. Pat. No. 7,185,136). In this system, when the device server receives the packets, the packets are unpackaged to extract the data, and the device server transmits the extracted data to the device.

By the way, when the client PC packages data into packets and transmits the packets to the device server, it is necessary, for example, to transmit and receive data for controlling the device (hereinafter referred to as the control data) between the client PC and the device server.

On the other hand, even when the control data is not transmitted and received, the client PC is required to transmit and receive data for managing the status of the device (hereinafter referred to as the management data) to and from the device via the device server. That is, the management data is always transmitted and received between the client PC and the device server.

Therefore, when the management data and the control data are transmitted and received in the form of packets, traffic is generated on the network even when data transmission and reception are not performed. In the case of a network to which a numerous number of unspecified devices are connected, such as the Internet, influence on such traffic cannot be ignored.

In addition, if the platform, such as an operating system (OS), is different between a device on a transmitting side and a device on a receiving side, parameters and a data format necessary for data transmission are different, and as a result, the data transmission may not be performed simply by transmitting and receiving the data in the form of packets.

SUMMARY OF THE INVENTION

The present invention provides an information processing apparatus in a device control system in which the information processing apparatus controls a device via a network, which is capable of suppressing an increase in traffic on the network, and what is more, capable of transmitting data even when the platform is different between a transmitting-side device and a receiving-side device, and a method of controlling the apparatus, a device control apparatus and a method of controlling the apparatus, and a device control system.

In a first aspect of the present invention, there is provided an information processing apparatus that is connected, via a network, to a device control apparatus to which a device is locally connected, comprising a request parameter creation unit configured to, when a transfer request to the device is received from an upper layer software program, extract predetermined parameters necessary for controlling the device via the device control apparatus from parameters included in the transfer request, as request parameters, transmit a device transfer request including the request parameters to the device, and store parameters included in the transfer request except the request parameters, as first parameters; and a transfer response generation unit configured to, when response parameters corresponding to the request parameters are received, generate a transfer response by adding the stored first parameters to the response parameters, and transmit the generated transfer response to the upper layer software program.

In a second aspect of the present invention, there is provided a device control apparatus that is connected to an information processing apparatus via a network, and has a device locally connected thereto, comprising a transfer request generation unit configured to receive a device transfer request from the information processing apparatus, extract predetermined parameters necessary for controlling the device, as request parameters, generate second parameters other than the request parameters, which are necessary for controlling the device, generate a second transfer request for controlling the device from the generated second parameters and the request parameters, and transmit the generated second transfer request to the device, and a response parameter creation unit configured to receive from the device a second transfer response as a response to the second transfer request, extract response parameters corresponding to the request parameters from the second transfer response, and transmit a device transfer response including the extracted response parameters to the information processing apparatus.

In a third aspect of the present invention, there is provided a device control system including an information processing apparatus, and a device control apparatus to which a device is locally connected, which are connected to each other via a network, wherein the information processing apparatus comprises a request parameter creation unit configured to, when a transfer request to the device is received from an upper layer software program, extract predetermined parameters necessary for controlling the device via the device control apparatus from parameters included in the transfer request, as request parameters, transmit a device transfer request including the request parameters to the device, and store parameters included in the transfer request except the request parameters, as first parameters, and a transfer response generation unit configured to, when response parameters corresponding to the request parameters are received, generate a transfer response by adding the stored first parameters to the response parameters, and transmit the generated transfer response to the upper layer software program, and wherein the device control apparatus comprises a transfer request generation unit configured to receive a device transfer request from the information processing apparatus, extract the request parameters, generate second parameters other than the request parameters, which are necessary for controlling the device, generate a second transfer request for controlling the device from the generated second parameters and the request parameters, and transmit the generated second transfer request to the device, and a response parameter creation unit configured to receive from the device a second transfer response as a response to the second transfer request, extract response parameters corresponding to the request parameters from the second transfer response, and transmit a device transfer response including the extracted request parameters to the information processing apparatus.

In a fourth aspect of the present invention, there is provided a method of controlling an information processing apparatus that is connected, via a network, to a device control apparatus to which a device is locally connected, comprising extracting, when a transfer request to the device is received from an upper layer software program, predetermined parameters necessary for controlling the device via the device control apparatus from parameters included in the transfer request, as request parameters, transmitting the request parameters to the device, and storing the parameters included in the transfer request except the request parameters, as first parameters, and generating, when response parameters corresponding to the request parameters are received, a transfer response by adding the stored first parameters to the response parameters, and transmitting the generated transfer response to the upper layer software program.

In a fifth aspect of the present invention, there is provided a method of controlling a device control apparatus that is connected to an information processing apparatus via a network, and has a device locally connected thereto, comprising receiving a device transfer request packet from the information processing apparatus, extracting predetermined parameters necessary for controlling the device, as request parameters, generate second parameters other than the request parameters, which are necessary for controlling the device, generating a second transfer request for controlling the device from the generated second parameters and the request parameters, and transmitting the generated second transfer request to the device, and receiving from the device a second transfer response as a response to the second transfer request, extracting response parameters corresponding to the request parameters from the second transfer response, and transmitting the extracted response parameters to the information processing apparatus.

According to the present invention, between the information processing apparatus and the device control apparatus, parameters necessary for controlling the device are transmitted and received, and hence it is possible to suppress an increase in traffic on the network, and even when the platform is different between the transmitting-side device and the receiving-side device, it is possible to transmit data.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
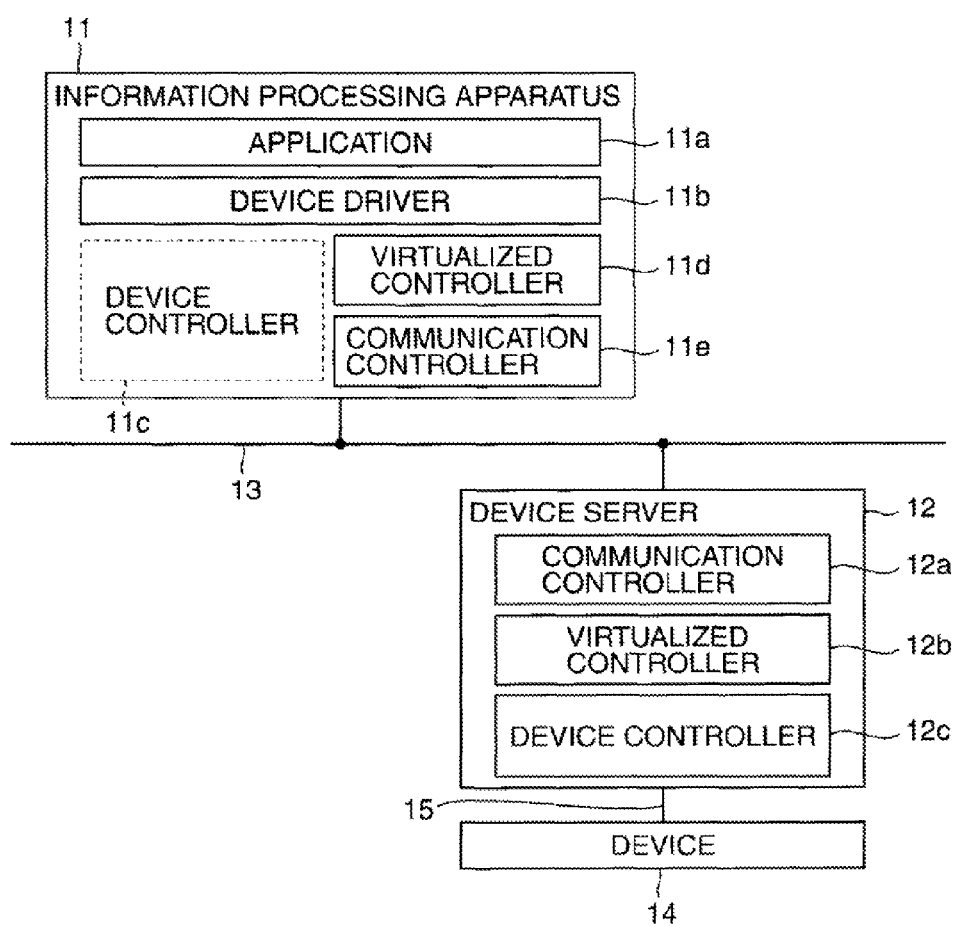
FIG. 1 is a block diagram of a device control system according to an embodiment of the present invention.

FIG. 1 is a block diagram of an example of a device control system according to a first embodiment of the present invention.

In FIG. 1, the device control system according to the first embodiment includes an information processing apparatus 11, and a device server 12 to which a device 14 is locally connected. The information processing apparatus 11 and the device server 12 are connected to each other via a network 13. Note that the network may be either of a wired network or a wireless network.

In the illustrated example, the device 14 which is an input/output device provided with a USB (universal serial bus) interface is locally connected to the device server 12 via a connection cable 15 compatible with the USB interface. Although the description will be given of an example in which the device 14 is connected via the USB interface, any of interfaces compatible with other interface standards, such as HDMI and Thunderbolt, may be used.

The device 14 appearing in FIG. 1 may be an input device, such as a keyboard, a mouse, or a card reader, or a display device (output device), or further, it may be a single-function peripheral device, such as a printer. Further, the device 14 may be a multifunction peripheral device having not only a print function, but also a scan function, a copy function, a storage function, and so forth, and may be any other input or output device. Note that the device server 12 and the device 14 may be integrated into a single unit or internally connected to each other.

Although in the example shown in FIG. 1, one information processing apparatus 11 and one device server 12 are shown, the system may be configured such that a plurality of information processing apparatuses and a plurality of device servers are connected via the network 13. Further, a plurality of devices may be connected to the device server 12.

The information processing apparatus 11 is an example of the information processing apparatus of the present invention. The information processing apparatus 11 is implemented e.g. by a PC (personal computer) which comprises a CPU, an input section, a display section, a memory, a communication section, an external storage section (none of which are shown), which are interconnected via an internal bus (not shown), and is capable of communicating with the device server 12 via the network 13.

The external storage section stores an operating system (hereinafter referred to as the OS), not shown, software components including an application 11a, a device driver 11b, a device controller 11c, a virtualized controller 11d, and a communication controller 11e, as well as various kinds of data. Under the control of the CPU, these software components and various kinds of data are loaded into the memory for execution of various kinds of control.

In the information processing apparatus 11, the application 11a controls a device (not shown) connected to the device controller 11c (i.e. the information processing apparatus itself) according to the device driver 11b. Further, the application 11a and the device driver 11b remotely control a device controller 12c provided in the device server 12 via the network 13 using the virtualized controller 11d and the communication controller 11e to thereby control the device 14 connected to the device server 12. Note that in FIG. 1, the information processing apparatus 11 may be configured not to include the device controller 11c. Even in such a case, the device driver 11b of the information processing apparatus 11 is capable of controlling the device controller 12c provided in the device server 12 to thereby control the device 14.

The application 11a instructs the virtualized controller 11d to connect and disconnect to and from the device 14. Further, the application 11a makes a request to the device driver 11b according to the user's operation, and receives a result of the request from the device driver 11b. Further, the application 11a requests the virtualized controller 11d to acquire server information on the device server 12 and device information on the device 14, and obtains a result of the request from the virtualized controller 11d.

The device driver 11b generates a first transfer request (hereinafter referred to as the transfer request 1), described hereinafter, according to the request from the application 11a, and passes the generated transfer request 1 to the virtualized controller 11d.

Note that when the device (not shown) directly connected to the device controller 11c is controlled, the transfer request 1 is passed to the device controller 11c. Then, the device driver 11b receives a first transfer response (hereinafter referred to as the transfer response 1) to the transfer request 1 from the device controller 11c or the virtualized controller 11d, and transfers the received transfer response 1 to the application 11a.

The virtualized controller 11d controls the device 14 connected to the device server 12 via the communication controller 11e, and hence, as if the device controller 12c provided in the device server 12 existed in the information processing apparatus 11, the virtualized controller 11d controls the device 14 via the device controller 12c (hereinafter referred to as the virtualized control). The communication controller 11e connects to the network 13 to control communication with the device server 12.

The device server 12 is an example of the device controller of the present invention. The device server comprises a CPU, a memory, a communication section, a USB interface, and an external storage section (none of which are shown), which are interconnected via an internal bus (not shown), and is capable of communicating with the information processing apparatus 11 via the network 13, and transmitting and receiving data to and from the locally connected device 14 via a connection cable.

The external storage section stores an OS (not shown), software components including a communication controller 12a, a virtualized controller 12b, and the device controller 12c, as well as various kinds of data. These software components and the stored various kinds of data are loaded into the memory for execution of various kinds of control under the control of the CPU.

The communication controller 12a connects to the network 13 to control communication with the information processing apparatus 11. The virtualized controller 12b communicates with the virtualized controller 11d of the information processing apparatus 11 via the communication controller 12a, and controls the device controller 12c. The device controller 12c controls the device 14 connected to the device server 12.

In the device control system configured as above, the information processing apparatus 11 remotely controls the device controller 12c via the virtualized controller 12b of the device server 12 using the virtualized controller 11d, whereby the information processing apparatus 11 can control the device 14 in the same manner as when the device 14 is locally connected to the information processing apparatus 11.

Figure 2:
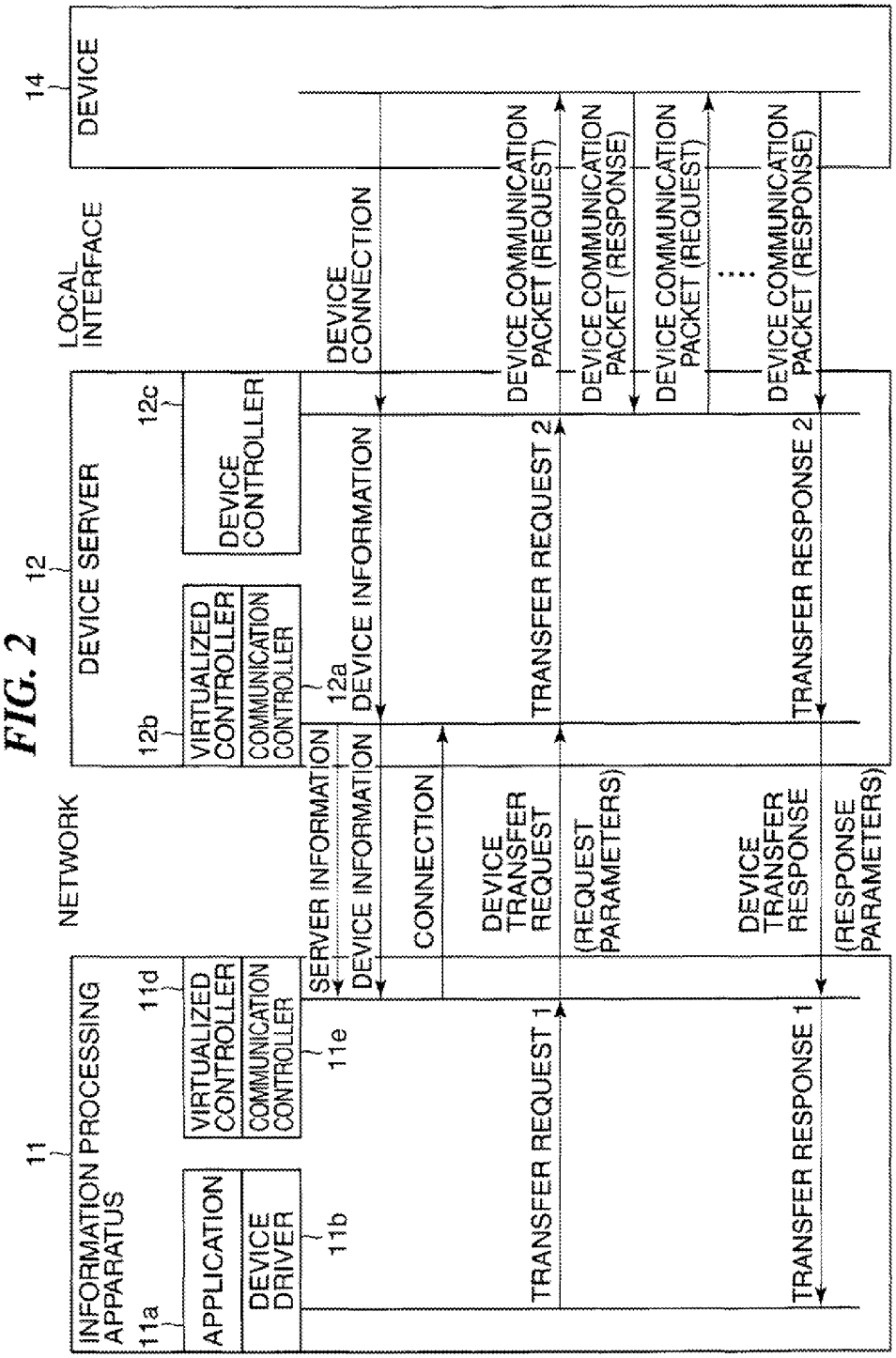
FIG. 2 is a sequence diagram useful in explaining data transmission and reception control executed in the device control system shown in FIG. 1.

FIG. 2 is a sequence diagram useful in explaining data transmission and reception control executed in the device control system shown in FIG. 1.

First, a description will be given of a process for identifying the device server 12 and the device 14, executed by the information processing apparatus 11.

Referring to FIGS. 1 and 2, as mentioned hereinabove, when the information processing apparatus 11 makes a server information request requesting acquisition of server information (server identification information, server setting information, etc.) on the device server 12, by the application 11a, the virtualized controller 11d passes the server information request to the communication controller 11e. Alternatively, if the virtualized controller 11d has stored the server information in an internal memory thereof, the virtualized controller 11d sends the stored server information back to the application 11a as a response.

Further, when the information processing apparatus 11 makes a device information request requesting acquisition of device information (device identification information, device configuration, a device type, etc.) necessary for identifying the device 14 from the application 11a, the virtualized controller 11d passes the device information request to the communication controller 11e. Alternatively, if the virtualized controller 11d has stored the device information in the internal memory thereof, the virtualized controller 11d sends back the stored device information to the application 11a as a response. Upon receipt of the server information request ((a) in FIG. 3) or the device information request ((c) in FIG. 3) from the virtualized controller 11d, the communication controller 11e transmits the server information request or the device information request to the device server 12 via the network 13.

Figure 3:
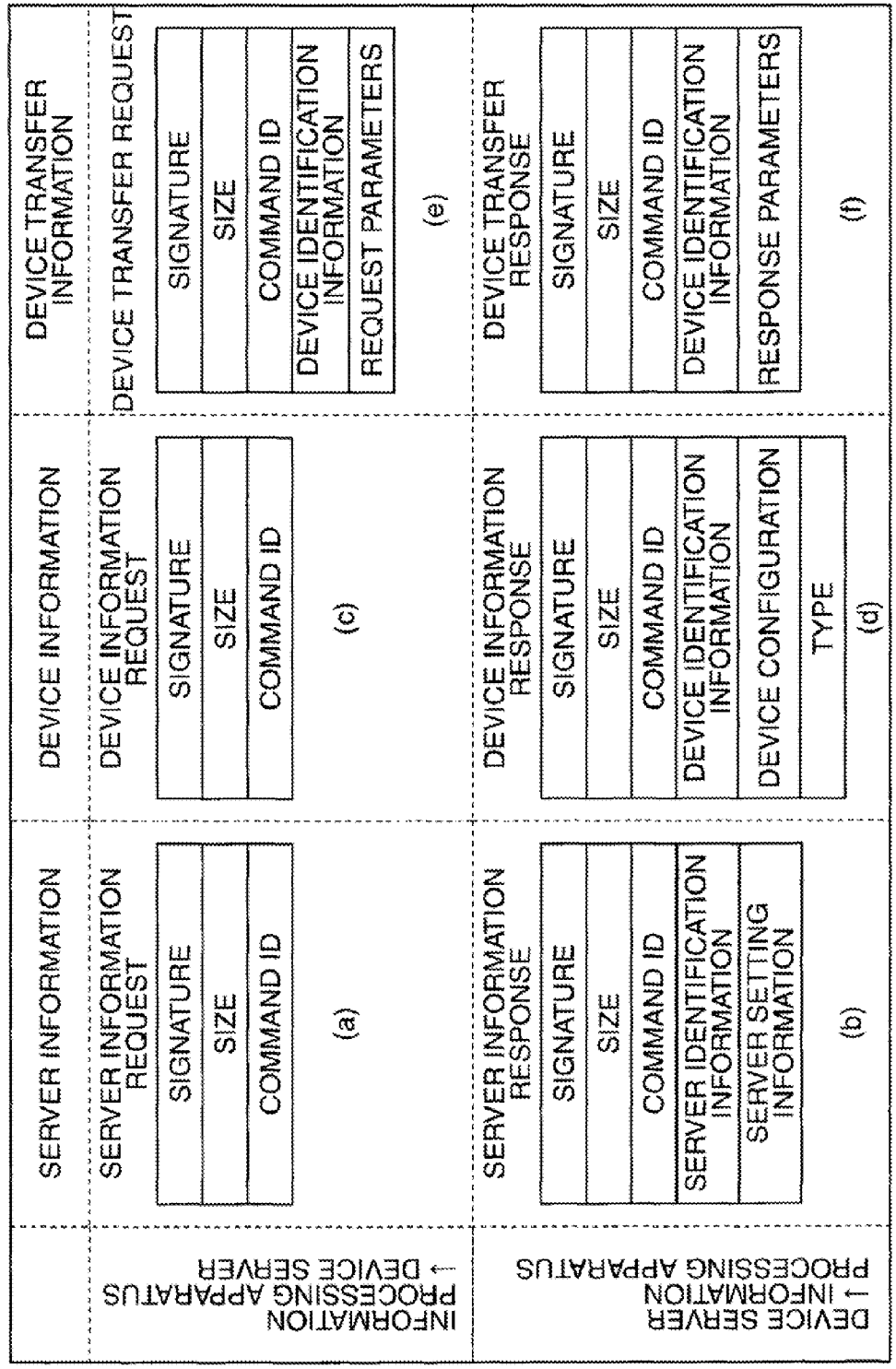
FIG. 3 is a diagram showing configurations of packet data transmitted and received between an information processing apparatus and a device server, appearing in FIG. 1.

A data configuration denoted by (a) in FIG. 3 shows a packet data configuration of the server information request which is transmitted from the information processing apparatus 11 to the device server 12, and includes a signature, a size (data size), and a command ID (ID indicative of the server information request). Further, a data configuration denoted by (c) in FIG. 3 shows a packet data configuration of the device information request which is transmitted from the information processing apparatus 11 to the device server 12, and includes a signature, a size (data size), and a command ID (ID indicative of the device information request).

When the device server 12 receives the server information request ((a) in FIG. 3) from the information processing apparatus 11 via the communication controller 12a, the virtualized controller 12b generates a server information response ((b) in FIG. 3) including the server identification information for identifying the device server 12 and the server setting information indicative of settings of the server and transmits the generated server information response to the information processing apparatus 11 via the communication controller 12a.

Further, also when the device server 12 is powered on or the settings of the device server 12 are changed, the virtualized controller 12b transmits the server information response to the information processing apparatus 11 via the communication controller 12a.

A data configuration denoted by (b) in FIG. 3 shows a packet data configuration of the server information response which is transmitted from the device server 12 to the information processing apparatus 11, and includes a signature, a size, a command ID (ID indicative of the server information response), server identification information (e.g. an IP address or a MAC address), and server setting information (e.g. an encryption setting and a port number).

Upon receipt of the server information response via the communication controller 11e, the information processing apparatus 11 transfers the received server information response to the virtualized controller 11d. The virtualized controller 11d stores the server information derived from the server information response in the internal memory.

Further, when the virtualized controller 12b of the device server 12 receives the device information request ((c) in FIG. 3) from the information processing apparatus 11 via the communication controller 12a, the virtualized controller 12b connects to the device 14 by the device controller 12c to acquire the device information (vender ID (VID)/product ID (PID)/device descriptor, etc.) from the device 14. Then, the virtualized controller 12b generates a device information response ((d) in FIG. 3) including the acquired device information, and transmits the generated device information response to the information processing apparatus 11 via the communication controller 12a.

Note that the device information response is transmitted also when the device 14 is connected and disconnected to and from the device server 12.

A data configuration denoted by (d) in FIG. 3 shows a packet data configuration of the device information response which is transmitted from the device server 12 to the information processing apparatus 11, and includes a signature, a size, a command ID (ID indicative of the device information response), device identification information (VID/PID, etc.), device configuration information (device configuration: e.g. a device descriptor), and a type (information for discriminating a change in status, such as connection/disconnection of the device).

Upon receipt of the device information response from the communication controller 11e, the virtualized controller 11d of the information processing apparatus 11 stores the device information derived from the device information response in the internal memory. Then, when the device information response is received from the communication controller 11e, the virtualized controller 11d judges that the device has been connected to the information processing apparatus 11, and executes a connection process (Plug & Play) using the communication controller 11e.

In the present embodiment, when an instruction for communication is given by the virtualized controller 11d, the communication controller 11e connects the device server 12 and the information processing apparatus 11 via the network 13 based on the server information received from the virtualized controller 11d.

The information processing apparatus 11 identifies the device server 12 and the device 14 as described above, and becomes capable of transferring data to and from the device 14 via the device server 12.

Next, a description will be given of a sequence of execution of data transfer between the information processing apparatus 11 and the device 14 via the device server 12. In the information processing apparatus 11, the device driver 11b generates a transfer request 1 for requesting parameters associated with the device 14 in response to the request from the application 11a, and passes the generated transfer request 1 to the virtualized controller 11d. The virtualized controller 11d extracts parameters to be transferred to the device controller 12c of the device server 12 from the transfer request 1 as request parameters, generates a device transfer request ((e) in FIG. 3) including the request parameters and the device identification information for identifying the device, and transmits the generated device transfer request to the device server 12.

A data configuration denoted by (e) in FIG. 3 shows a packet data configuration of the device transfer request which is transmitted from the information processing apparatus 11 to the device server 12, and includes a signature, a size (data size), a command ID (ID indicative of the device transfer request), device identification information for uniquely identifying a device connected to the device server 12, and the request parameters.

Upon receipt of the device transfer request ((e) in FIG. 3) from the information processing apparatus 11 via the communication controller 12a, the virtualized controller 12b identifies the device 14 to which the data is to be transferred based on the device identification information included in the device transfer request. Then, the virtualized controller 12b converts the request parameters included in the device transfer request to data in a format for transfer to the device controller 12c of the device server 12 to thereby generate a second transfer request (hereinafter referred to as the transfer request 2), and passes the generated transfer request 2 to the device controller 12c. The device controller 12c generates a device communication packet (request) based on the transfer request 2, and transmits the generated device communication packet (request) to the device 14.

Then, upon receipt of a device communication packet (response) from the device 14 via the device controller 12c, the device server 12 sends response information (hereinafter referred to as the transfer response 2) based on the device communication packet (response) to the virtualized controller 12b. The virtualized controller 12b extracts parameters corresponding to the request parameters from the transfer response 2 as the response parameters, generates a device transfer response ((f) in FIG. 3) including the response parameters, and transmits the generated device transfer response to the information processing apparatus 11 via the communication controller 12a.

A data configuration denoted by (f) in FIG. 3 shows an example of the packet data configuration of the device transfer response which is transmitted from the device server 12 to the information processing apparatus 11, and includes a signature, a size, a command ID (ID indicative of the device transfer response), device identification information, and response parameters. The device identification information is added so as to uniquely identify a device connected to the device server 12.

When the information processing apparatus 11 receives the device transfer response ((f) in FIG. 3) from the device server 12, the communication controller 11e passes the received device transfer response to the virtualized controller 11d. Then, the virtualized controller 11d sends the first transfer response (hereinafter referred to as the transfer response 1) formed by converting the response parameters included in the device transfer response to a predetermined data format, to the device driver 11b, and the device driver 11b passes the transfer response 1 to the application 11a.

The information processing apparatus 11 and the device 14 execute the data transfer via the device server 12 as described above. Then, when instructed to terminate the communication by the virtualized controller 11d of the information apparatus 11, the communication controller 11e disconnects from the device server 12.

Now, the above-mentioned request parameters and response parameters will be described in detail.

Figure 4:
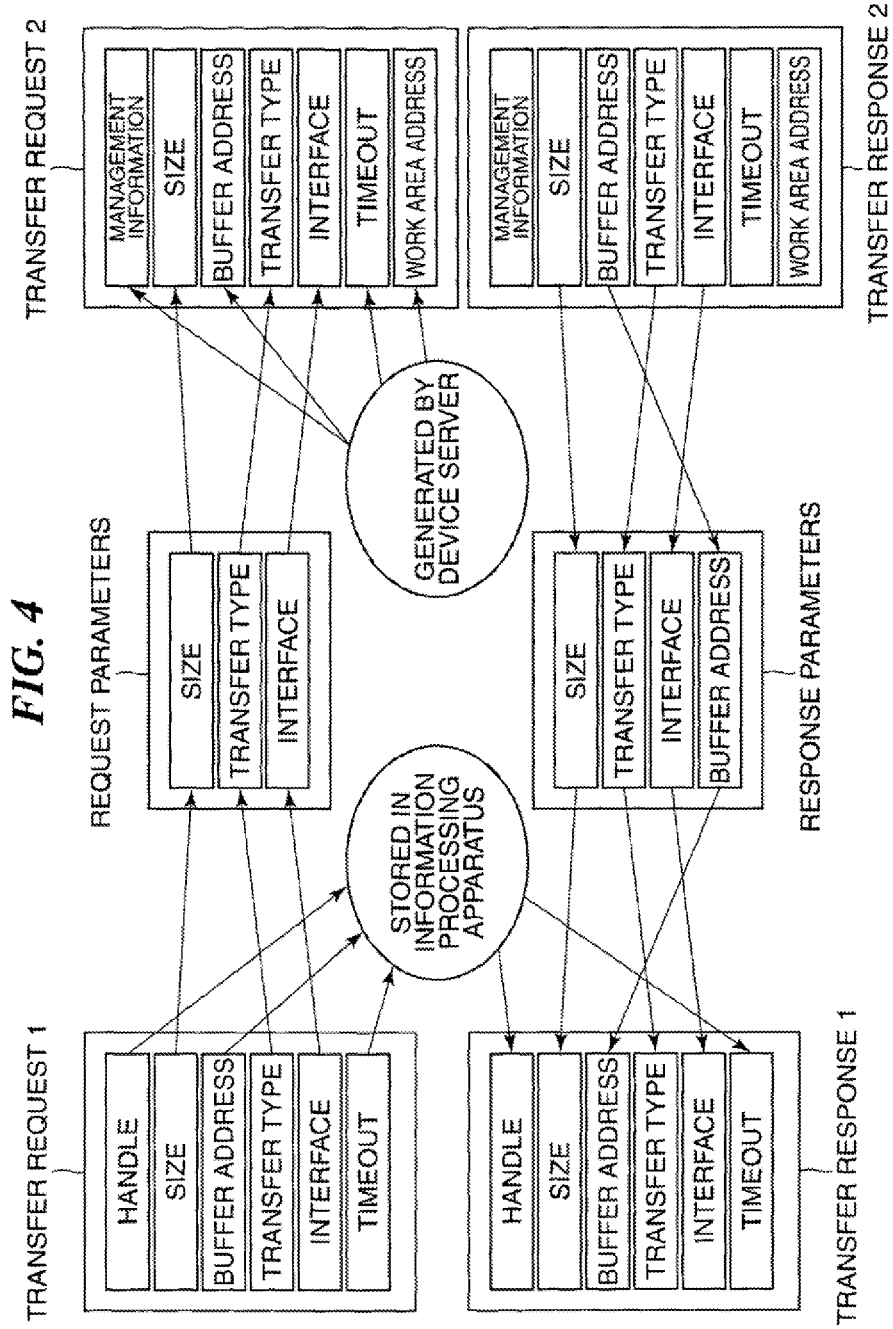
FIG. 4 is a diagram useful in explaining request parameters and response parameters transferred in the device control system shown in FIG. 2.

FIG. 4 is a diagram useful in explaining the request parameters and the response parameters transferred in the device control system shown in FIG. 2.

First, a description will be given of the request parameters. As described with reference to FIG. 2, the device driver 11b of the information processing apparatus 11 generates the transfer request 1 according to the request from the application 11a. This transfer request 1 includes a handle (e.g. a number for identifying a control target), a size (data size), a buffer address, a transfer type (transfer method), an interface (interface type), and a timeout (response waiting time), e.g., as the parameters.

Upon receipt of the transfer request 1, the virtualized controller 11d of the information processing apparatus 11 extracts parameters (request parameters) to be passed to the device controller 12c of the device server 12. The request parameters are determined in advance in association with the command ID, and the virtualized controller 11d stores the parameters other than the request parameters in the internal memory. In the present example, the virtualized controller 11d stores the handle, the buffer address, and the timeout (which are predetermined parameters) in the internal memory, and extracts the size, the transfer type, and the interface, as the request parameters. Then, the virtualized controller 11d generates the device transfer request including the request parameters and the device identification information for identifying the device, and transmits the generated device transfer request to the device server 12.

In the device server 12, upon receipt of the device transfer request, the virtualized controller 12b identifies the device 14 based on the device identification information included in the received device transfer request, and generates parameters (management information associated with the device 14, a buffer address, a timeout, and a work area address necessary for converting the device transfer request to data in the format for transfer to the device controller 12c. Note that the device identification information is stored in the internal memory. Then, the virtualized controller 12b generates the transfer request 2 based on the generated parameters and the request parameters (the size, the transfer type, and the interface) included in the device transfer request, and sends the generated transfer request 2 to the device controller 12c. The device controller 12c generates a device communication packet (request) corresponding to the transfer request 2, and sends the generated device communication packet to the identified device 14.

Next, a description will be given of the response parameters. Upon receipt of a device communication packet (response) from the device 14, the device controller 12c sends the transfer response 2 corresponding to the received device communication packet to the virtualized controller 12b. The transfer response 2 includes the management information associated with the device 14 and the parameters, such as the size, the buffer address, the transfer type, the interface, the timeout, and the work area address. The virtualized controller 12b refers to the request parameters and the transfer request 2 to thereby extract parameters corresponding to the request parameters and the buffer address from the transfer response 2, as the response parameters. In the illustrated example, the size, the transfer type, the interface, and the buffer address are extracted from the transfer response 2 as the response parameters. Note that a data buffer indicated by the buffer address stores the data (a processing result, a response, etc.) from the device 14. Then, the virtualized controller 12b generates the device transfer response including the response parameters and the device identification information stored in the internal memory, and transmits the generated device transfer response to the information processing apparatus 11, using the communication controller 12a.

In the information processing apparatus 11, upon receipt of the device transfer response via the communication controller 11e, the virtualized controller 11d adds the handle and the timeout stored in the internal memory to the response parameters (the size, the transfer type, the interface, and the buffer address) of the received device transfer response to thereby generate the transfer response 1 which is converted to the predetermined data format, and sends the generated transfer response 1 to the device driver 11b. The device driver 11b passes the transfer response 1 to the application 11a.

As described above, the virtualized controller 11d provided in the information processing apparatus 11 sends parameters to be acquired from the device server 12 to the device server 12 as the request parameters according to the transfer request 1 from the device driver 11b. On the other hand, the virtualized controller 12b provided in the device server 12 generates the transfer request 2 according to the request parameters and acquires the parameters associated with the device 14. Then, the virtualized controller 12b transmits response parameters corresponding to the request parameters to the information processing apparatus 11.

Therefore, parameters necessary for controlling the device 14 are transmitted and received between the information processing apparatus 11 and the device server 12, and hence it is possible to suppress an increase in traffic on the network 13. In addition, the information processing apparatus 11 and the device server 12 each extract parameters necessary for controlling the device, and hence, it is possible to reduce dependency on the platform.

Figure 5:
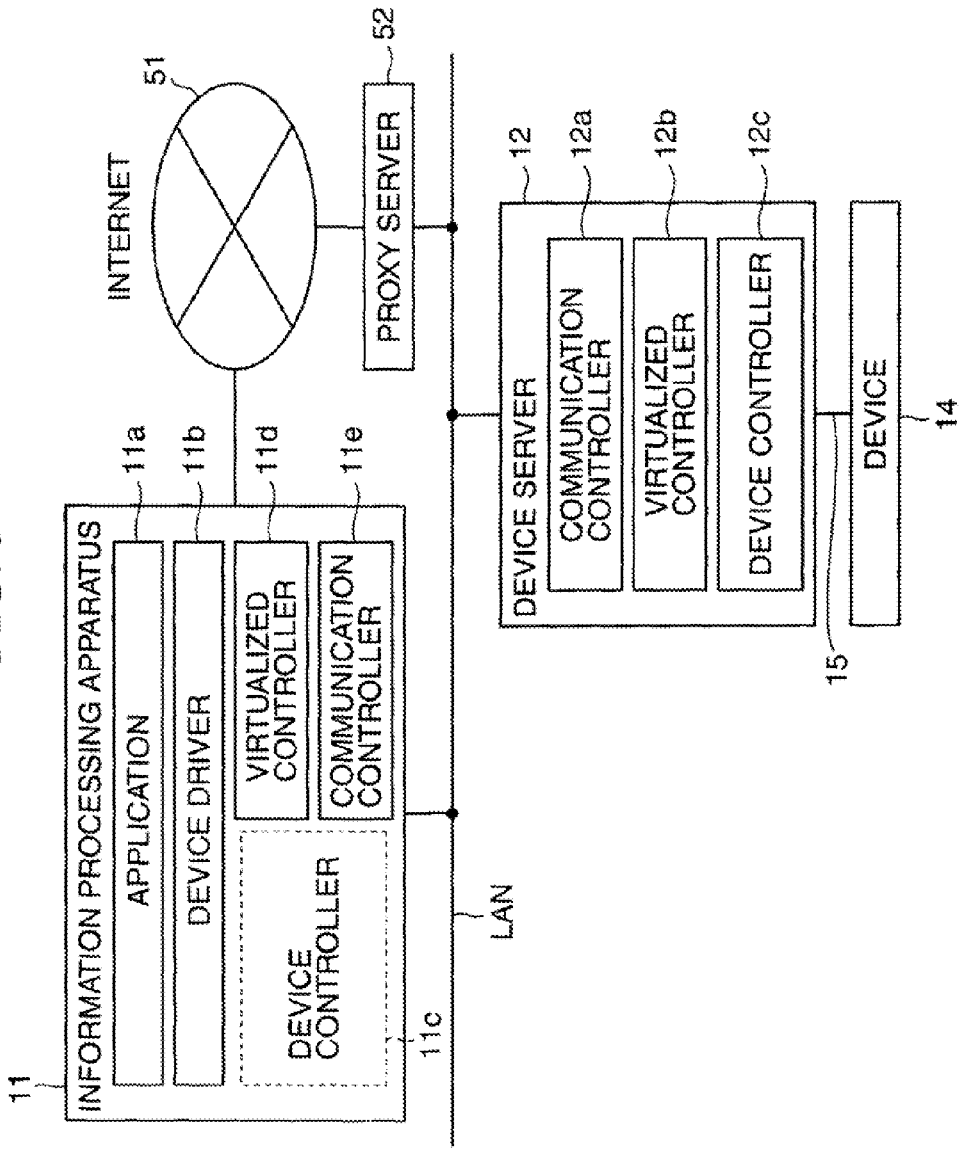
FIG. 5 is a block diagram of a device control system according to a second embodiment of the present invention, in which the network is the Internet.

FIG. 5 is a block diagram of a device control system according to a second embodiment of the present invention, which show a case where the network 13 appearing in FIG. 1 is connected via an external network, such as the Internet.

In FIG. 5, the same components as those shown in FIG. 1 are denoted by the same reference numerals, and description thereof is omitted.

When the information processing apparatus 11 and the device server 12 are connected via the Internet 51, information for uniquely identifying the information processing apparatus 11 (e.g. global IP/URL) and information necessary for connection (e.g. encryption/port number/proxy information) are set in the device server 12 in advance.

Further, when a proxy server 52 is interposed between the device server 12 and the Internet 51 as shown in FIG. 5, access from the information processing apparatus 11 to the device server 12 is sometimes blocked by the proxy server 52. In this case, information on the device server 12 and the device 14 (server information and device information) cannot be acquired, which disables the information processing apparatus 11 to perform the virtualized control. To eliminate this inconvenience, in the present embodiment, first, the server information and device information are sent from the device server 12 to information processing apparatus 11, and the information processing apparatus 11 identifies the device server 12 and the device 14 based on the received server information and device information, and then is enabled to communicate with the device server 12 and the device 14.

Figure 6:
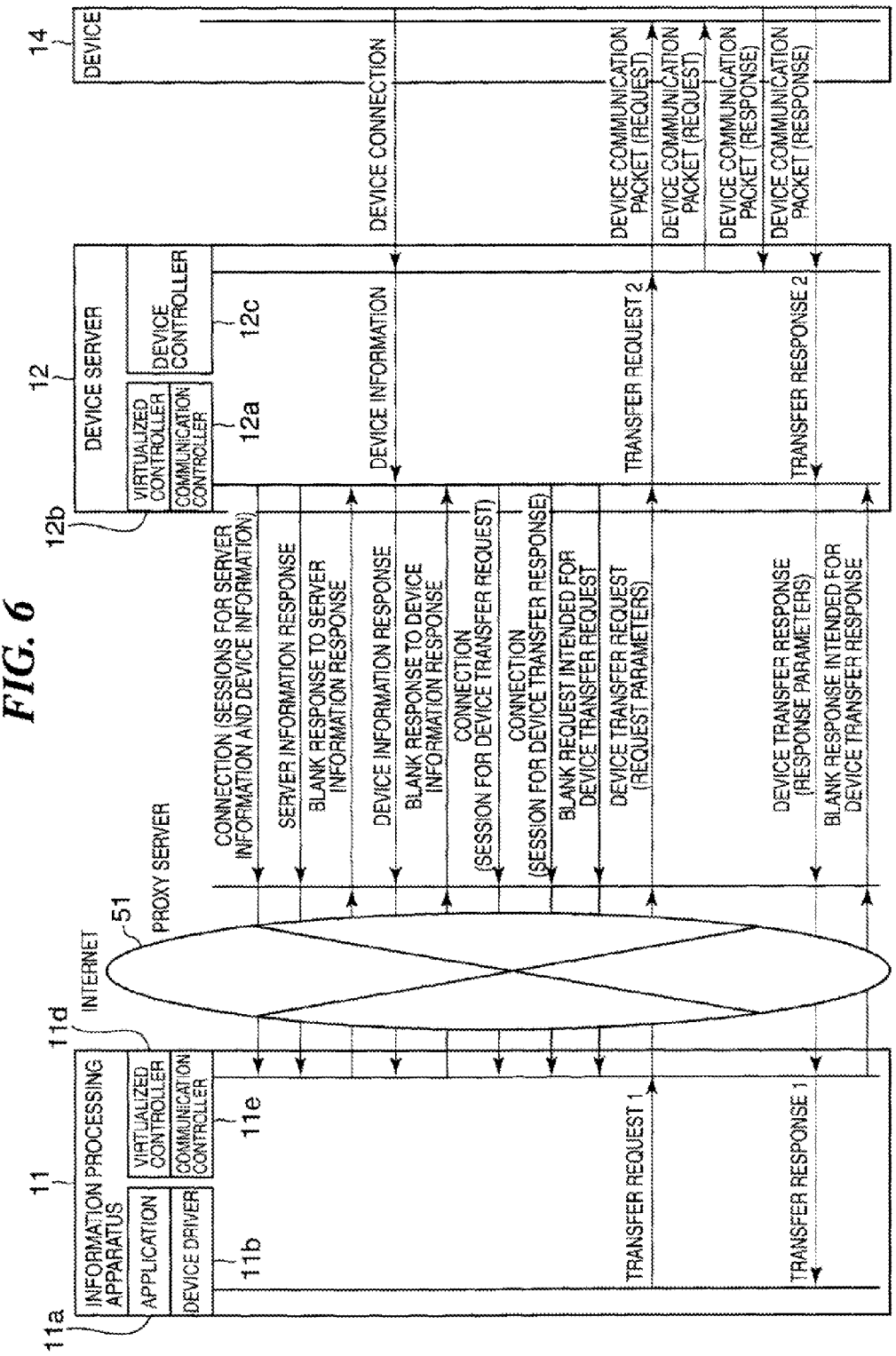
FIG. 6 is a sequence diagram useful in explaining the data transmission and reception control executed in the device control system shown in FIG. 5.

FIG. 6 is a sequence diagram useful in explaining the data transmission and reception control executed in the device control system shown in FIG. 5.

In FIG. 6, for example, when the device server 12 is powered on, the virtualized controller 12b connects to the information processing apparatus 11 using the communication controller 12a through the proxy server 52 via the Internet 51 (connected by a session for the server information and the device information). Next, the virtualized controller 12b generates a server information response, and transmits the generated server information response ((a) in FIG. 7) which is converted to data in a format compatible with the Internet protocol by the communication controller 12a, to the information processing apparatus 11.

Figure 7:
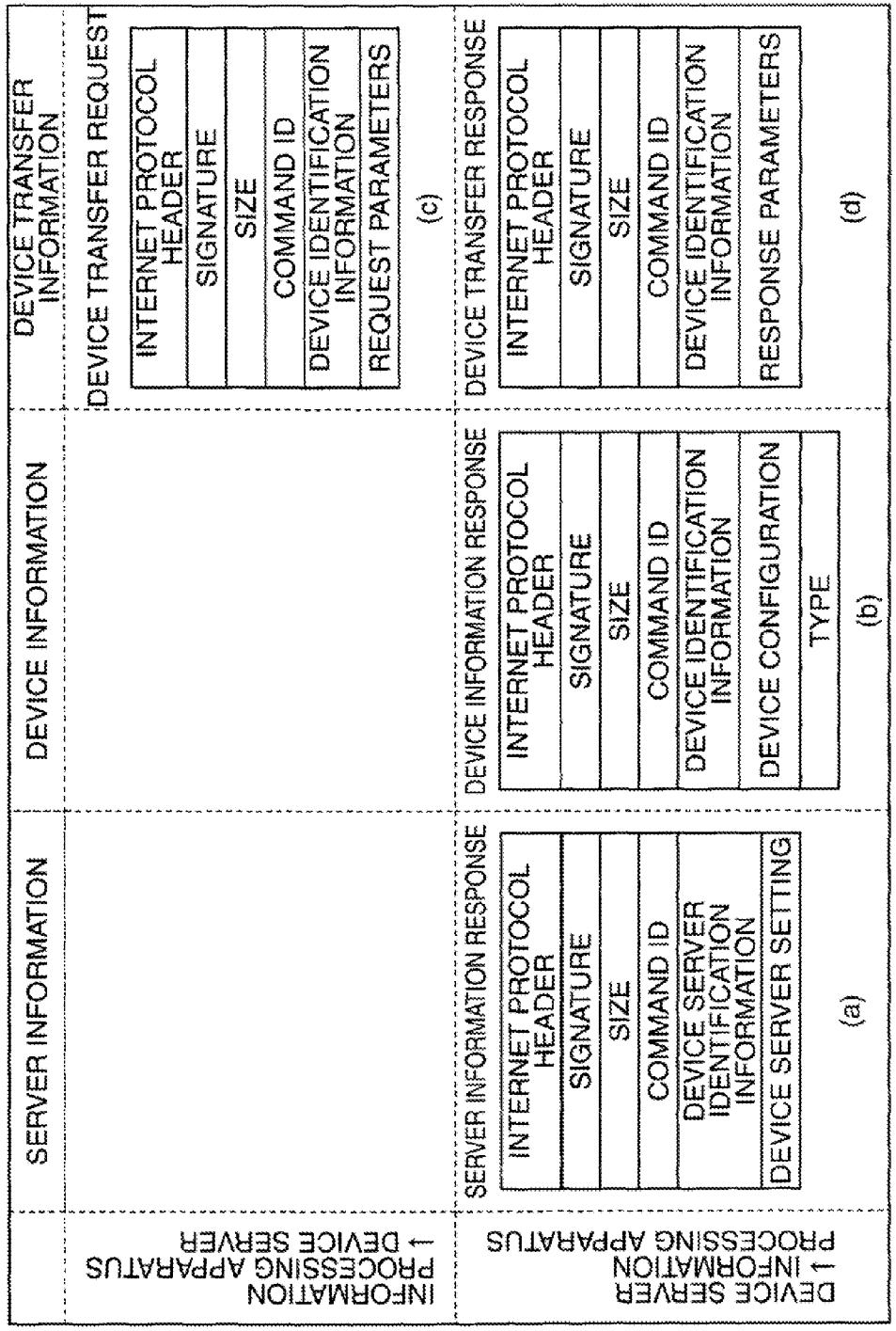
FIG. 7 is a diagram showing configurations of packet data transmitted and received between the information processing apparatus and the device server, appearing in FIG. 5.

A data configuration denoted by (a) in FIG. 7 shows a packet data configuration of the server information response which is transmitted from the device server 12 to the information processing apparatus 11, and includes an Internet protocol header, a signature, a size (data size), a command ID (ID indicative of the server information response), device server identification information, and device server setting information.

The information processing apparatus 11 identifies the device server 12 based on the server information response ((a) in FIG. 7), generates a blank response to the server information response as a response, using the virtualized controller 11d, and transmits the generated blank response to the device server 12 via the communication controller 11e.

When the device server 12 receives the blank response to the server information response, the virtualized controller 12b acquires the device information using the device controller 12c, generates a device information response, and transmits the generated device information response ((b) in FIG. 7) which is converted to data in a format compatible with the Internet protocol by the communication controller 12a, to the information processing apparatus 11.

A data configuration denoted by (b) in FIG. 7 shows a packet data configuration of the device information response which is transmitted from the device server 12 to the information processing apparatus 11, and includes an Internet protocol header, a signature, a size (data size), a command ID (ID indicative of the device information response), device identification information, device configuration information, and a type.

The information processing apparatus 11 identifies the device 14 based on the device information response ((b) in FIG. 7), generates a blank response to the device information response as a response using the virtualized controller 11d, and transmits the generated blank response to the device server 12 via the communication controller 11e.

As described above, the device server 12 transmits the server information response and the device information response to the information processing apparatus 11 to notify the information processing apparatus 11 of the server information and the device information, whereby the information processing apparatus 11 is enabled to virtually control the device 14.

The device server 12 notifies the server information and the device information to the information processing apparatus 11, e.g., when the device server 12 is powered on, when the settings of the device server 12 are changed, or when the device 14 is connected to the device server 12, other than the above cases. Note that the device server 12 executes processing for retrying transmission of the server information response and the device information response until a blank response to the server information response and a blank response to the device information response are received from the information processing apparatus 11.

Upon receipt of the blank response to the device information response from the information processing apparatus 11, the device server 12 starts the data transmission and reception control. First, the virtualized controller 12b requests a session for the device transfer request and a session for the device transfer response (two sessions) to the information processing apparatus 11 via the communication controller 12a, and connects to the information processing apparatus 11. Then, after the connection is completed, the virtualized controller 12b sends a blank request intended for the device transfer request to the information processing apparatus 11 via the communication controller 12a. The information processing apparatus 11 receives the blank request via the communication controller 11e to thereby start the data transmission and reception control.

A subsequent part of the sequence shown in FIG. 6 during execution of data transmission and reception is the same as a corresponding part of the sequence described with reference to FIG. 2. That is, the device driver 11b of the information processing apparatus 11 generates the transfer request 1 for requesting the parameters associated with the device 14 in response to the request from the application 11a, and passes the generated transfer request 1 to the virtualized controller 11d. The virtualized controller 11d generates the device transfer request according to the transfer request 1, and transmits the generated device transfer request ((c) in FIG. 7) which is converted to data in a format compatible with the Internet protocol by the communication controller 11e, to the device server 12.

A data configuration denoted by (c) in FIG. 7 shows a packet data configuration of the device transfer request which is transmitted from the information processing apparatus 11 to the device server 12, and includes an Internet protocol header, a signature, a size (data size), a command ID (ID indicative of the device transfer request), device identification information, and transfer parameters (request).

Upon receipt of the device transfer request ((c) in FIG. 7), the virtualized controller 12b identifies the device to which data is to be transferred, based on the device identification information included in the received device transfer request. Then, the virtualized controller 12b generates the transfer request 2 based on the request parameters included in the device transfer request, and passes the generated transfer request 2 to the device controller 12c with a designation of the identified device. The device controller 12c generates a device communication packet (request) based on the transfer request 2, and transmits the generated device communication packet (request) to the device 14.

Then, when the device server 12 receives a device communication packet (response) from the device 14 via the device controller 12c, the device server 12 sends response information (hereinafter referred to as the transfer response 2) corresponding to the received device communication packet (response) to the virtualized controller 12b. The virtualized controller 12b extracts parameters corresponding to the request parameters from the transfer response 2, as the response parameters, to generate a device transfer response, and transmits the generated device transfer response ((d) in FIG. 7) which is converted to data in a format compatible with the Internet protocol by the communication controller 12a, to the information processing apparatus 11.

A data configuration denoted by (d) in FIG. 7 shows a packet data configuration of the device transfer response which is transmitted from the device server 12 to the information processing apparatus 11, and includes an Internet protocol header, a signature, a size, a command ID (ID indicative of the device transfer response), device identification information, and transfer parameters (response).

When the information processing apparatus 11 receives the device transfer response ((d) in FIG. 7) from the device server 12, the communication controller 11e transfers the received device transfer response to the virtualized controller 11d.

Then, the virtualized controller 11d sends the device transfer response to the device driver 11b as the first transfer response (transfer response 1). Then, the virtualized controller 11d generates a blank response intended for the device transfer response, and transmits the generated blank response to the device server 12 via the communication controller 11e. This "blank response intended for the device transfer response" is generated as a response to the "blank request intended for the device transfer request" received from the device server 12 at the start of the data transmission and reception.

Upon receipt of the blank response, the device server 12 sends a blank request intended for the next device transfer request to the information processing apparatus 11, and the data transmission and reception via the Internet 51 is sequentially executed.

A termination signal is sent from the information processing apparatus 11 or the device server 12, whereby the data transmission and reception is terminated.

Note that in the device control system of the present invention, it is possible to perform communication using an application layer protocol, such as an HTTP (hyper text transfer protocol), an SMTP (simple mail transfer protocol), or an FTP (file transfer protocol), and communication can be performed without configuring special settings on network devices on the Internet.

Further, when performing communication using a protocol (e.g. HTTP) configured such that after a response to a request is received, a next request is sent, the next request cannot be executed unless the response is received, and hence there sometimes occurs a case where the delay of the response causes delay of the data transfer. Therefore, using two sessions as in the present embodiment to thereby separate processing for transmitting requests and processing for receiving responses such that the device transfer request is executed by a session for the device transfer request and the device transfer response is executed by a session for the device transfer response, it is possible to reduce the delay of the data transfer, and speed up the data transfer processing.

As described above, according to the present embodiment, even in the case where connection is performed via an external network, such as the Internet, similarly to the first embodiment, it is possible to suppress an increase in traffic on the network, and what is more, it is possible to transmit data even when the platform is different between the information processing apparatus 11 and the device server 12.

As is clear from the above description, in the examples shown in FIGS. 1 and 5, the virtualized controller 11d and the communication controller 11e function as a request parameter creation unit and a transfer response generation unit. Further, the communication controller 12a, the virtualized controller 12b, and the device controller 12c function as a transfer request generation unit and a response parameter creation unit. Further, the virtualized controller 11d and the communication controller 11e function as an identification information acquisition unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2011-223459, filed Oct. 7, 2011, which is hereby incorporated by reference herein in its entirety.

What is claimed is:

1. An information processing apparatus that is connected, via a network, to a device control apparatus to which a device is locally or internally connected, comprising:
   (A) a processor;
   (B) an identification information acquisition unit configured to acquire device control apparatus identification information associated with the device control apparatus, and device identification information associated with the device, from the device control apparatus;
   (C) a request parameter creation unit configured to perform the following operations when a transfer request to the device is received from an upper layer software program:
      (i) extract predetermined parameters necessary for controlling the device via the device control apparatus from parameters included in the transfer request, as request parameters,
      (ii) transmit a device transfer request including the request parameters to the device, and
      (iii) store parameters included in the transfer request except the request parameters, as first parameters; and
   (D) a transfer response generation unit configured to perform the following operations when response parameters corresponding to the request parameters are received:
      (i) generate a transfer response by adding the stored first parameters to the response parameters, and
      (ii) transmit the generated transfer response to the upper layer software program.

2. The information processing apparatus according to claim 1, wherein the device transfer request includes at least the request parameters and the device identification information.

3. A device control apparatus that is connected to an information processing apparatus via a network, and has a device locally or internally connected thereto, comprising:
   (A) a processor;
   (B) a transfer request generation unit configured to perform the following operations:
      (i) receive a device transfer request from the information processing apparatus,
      (ii) extract predetermined parameters necessary for controlling the device, as request parameters,
      (iii) generate second parameters other than the request parameters, which are necessary for controlling the device,
      (iv) generate a second transfer request for controlling the device from the generated second parameters and the request parameters, and
      (v) transmit the generated second transfer request to the device; and
   (C) a response parameter creation unit configured to perform the following operations:
      (i) receive from the device a second transfer response as a response to the second transfer request, (ii) extract response parameters corresponding to the request parameters from the second transfer response, and (iii) transmit a device transfer response including the extracted response parameters to the information processing apparatus.

4. The device control apparatus according to claim 3, wherein the device transfer response includes at least the response parameters and device identification information associated with the device.

5. The device control apparatus according to claim 3, wherein the device control apparatus establishes a first session for transferring the device transfer request and a second session for transferring the device transfer response, between the information processing apparatus and the device control apparatus, for data transmission and reception.

6. A device control system including an information processing apparatus, and a device control apparatus to which a device is locally or internally connected, which are connected to each other via a network, wherein the information processing apparatus comprises:

(A) a processor;

(B) a request parameter creation unit configured to perform the following operations when a transfer request to the device is received from an upper layer software program:

(i) extract predetermined parameters necessary for controlling the device via the device control apparatus from parameters included in the transfer request, as request parameters, (ii) transmit a device transfer request including the request parameters to the device, and (iii) store parameters included in the transfer request except the request parameters, as first parameters; and (C) a transfer response generation unit configured to perform the following operations when response parameters corresponding to the request parameters are received:

(i) generate a transfer response by adding the stored first parameters to the response parameters, and (ii) transmit the generated transfer response to the upper layer software program, and wherein the device control apparatus comprises:

(A) a transfer request generation unit configured to receive the device transfer request from the information processing apparatus, extract the request parameters, generate second parameters other than the request parameters, which are necessary for controlling the device, generate a second transfer request for controlling the device from the generated second parameters and the request parameters, and transmit the generated second transfer request to the device; and (B) a response parameter creation unit configured to receive from the device a second transfer response as a response to the second transfer request, extract response parameters corresponding to the request parameters from the second transfer response, and transmit a device transfer response including the extracted response parameters to the information processing apparatus.

7. The device control system according to claim 6, wherein the device control apparatus transmits a blank request intended for the device transfer request to the information processing apparatus to thereby start data transmission and reception.

8. The device control system according to claim 7, wherein the information processing apparatus transmits a blank response intended for the device transfer response to the device control apparatus to thereby request a blank request for the device transfer request.

9. A method of controlling an information processing apparatus that is connected, via a network, to a device control apparatus to which a device is locally or internally connected, comprising:

extracting, when a transfer request to the device is received from an upper layer software program, predetermined parameters necessary for controlling the device via the device control apparatus from parameters included in the transfer request, as request parameters, transmitting the request parameters to the device, and storing the parameters included in the transfer request except the request parameters, as first parameters, when a transfer request to the device is received from an upper layer software program; and generating, when response parameters corresponding to the request parameters are received, a transfer response by adding the stored first parameters to the response parameters, and transmitting the generated transfer response to the upper layer software program, when response parameters corresponding to the request parameters are received.

10. A method of controlling a device control apparatus that is connected to an information processing apparatus via a network, and has a device locally or internally connected thereto, comprising:

receiving a device transfer request packet from the information processing apparatus, extracting predetermined parameters necessary for controlling the device, as request parameters, generate second parameters other than the request parameters, which are necessary for controlling the device, generating a second transfer request for controlling the device from the generated second parameters and the request parameters, and transmitting the generated second transfer request to the device; and receiving from the device a second transfer response as a response to the second transfer request, extracting response parameters corresponding to the request parameters from the second transfer response, and transmitting the extracted response parameters to the information processing apparatus.

* * * * *